United States Patent
Knobloch, Jr. et al.

(10) Patent No.: US 9,429,189 B2
(45) Date of Patent: Aug. 30, 2016

(54) RESETTABLE DOWNHOLE TORQUE LIMITER AND RELATED METHODS OF USE

(71) Applicant: Halliburton Energy Services, Inc., Houston, TX (US)

(72) Inventors: Benton T. Knobloch, Jr., Broussard, LA (US); Todd J. Roy, Youngsville, LA (US); David J. Tilley, Franklin, LA (US)

(73) Assignee: Halliburton Energy Services, Inc., Houston, TX (US)

( * ) Notice: Subject to any disclaimer, the term of this patent is extended or adjusted under 35 U.S.C. 154(b) by 337 days.

(21) Appl. No.: 14/052,039

(22) Filed: Oct. 11, 2013

(65) Prior Publication Data

US 2014/0060856 A1 Mar. 6, 2014

Related U.S. Application Data

(62) Division of application No. 13/051,813, filed on Mar. 18, 2011, now Pat. No. 8,616,292.

(60) Provisional application No. 61/315,598, filed on Mar. 19, 2010.

(51) Int. Cl.
| | |
|---|---|
| *E21B 10/22* | (2006.01) |
| *F16C 19/54* | (2006.01) |
| *E21B 4/00* | (2006.01) |
| *E21B 17/04* | (2006.01) |
| *F16C 33/58* | (2006.01) |
| *E21B 23/04* | (2006.01) |
| *E21B 17/06* | (2006.01) |

(52) U.S. Cl.
CPC .............. *F16C 19/54* (2013.01); *E21B 4/003* (2013.01); *E21B 17/04* (2013.01); *E21B 17/06* (2013.01); *E21B 23/04* (2013.01); *F16C 19/541* (2013.01); *F16C 33/581* (2013.01); *F16C 2220/62* (2013.01); *F16C 2352/00* (2013.01)

(58) Field of Classification Search
CPC ........ E21B 10/22; E21B 4/033; F16C 31/04; F16C 39/04; F16C 2361/43
USPC ............................................ 166/241.1, 242.7
See application file for complete search history.

(56) References Cited

U.S. PATENT DOCUMENTS

| | | | | |
|---|---|---|---|---|
| 3,854,781 A | * | 12/1974 | Bildtsen | F16C 17/20 384/102 |
| 4,492,481 A | * | 1/1985 | Shore | F16C 39/04 384/121 |
| 5,322,434 A | * | 6/1994 | Milewski | F27D 15/022 110/288 |
| 6,997,271 B2 | * | 2/2006 | Nichols | E21B 17/07 175/24 |

* cited by examiner

*Primary Examiner* — Cathleen Hutchins

(57) ABSTRACT

Disclosed is a torque limiter having driver mandrel and driven axially aligned mandrels, a piston movable into and out of an engaged position wherein the driver and driven mandrels are coupled together to transmit torque there between. Hydraulically locking the movable piston in an engaged position. Disengaging the hydraulic lock when during rotation when a specified torque magnitude is exceeded to allow relative rotation between the mandrels. Resetting the torque limiter by hydraulically locking the piston in the engaging position when relative rotation ceases or is reduced.

20 Claims, 12 Drawing Sheets

RESETTABLE DOWNHOLE TORQUE LIMITER AND RELATED METHODS OF USE

CROSS REFERENCE TO RELATED APPLICATIONS

This patent application is a divisional of U.S. application Ser. No. 13/051,813, filed Mar. 18, 2011, which claims priority to U.S. Provisional Patent Application No. 61/315,598, filed Mar. 19, 2010, which is hereby incorporated by reference in its entirety.

BACKGROUND

Technical Field

This invention relates, generally, to apparatus and methods used in well servicing, such as oil and gas wells. More specifically, this invention relates to apparatus which joins two downhole elements together in a tubing string and limits the torque transmitted from one element to another.

SUMMARY OF THE INVENTIONS

A common problem encountered in drilling and servicing hydrocarbon wells is found when using an assembly of pipe sections which steps down in diameter to extend into a relatively smaller diameter borehole below the larger main casing section. In, for example, a "drillstring," the reduced diameter drillpipe and their threaded connections have lower torque specifications than the larger diameter drillpipe it is connected to. It is therefore desirable to limit the magnitude of the torque transferred to the reduced diameter section of drillpipe to prevent damage to the smaller pipe. As used herein, the term "torque" is used to refer to the turning force applied to an object measured in force-distance units.

Prior downhole torque limiting systems utilized shear pins or other elements which are designed to fail when a specified torque is exceeded, allowing the pipe sections to rotate with respect to each other. To reset these devices, the drillstring was removed from the well and the fractured pin replaced. Requiring the device to be brought to the surface is undesirable and expensive.

The apparatus of the present invention has an axial passageway and acts as a downhole torque limiter when connected between a driver and a driven member, such as, between two different size pipes. The present invention can be preset to disengage or slip when specified torque magnitude is exceeded and will reset without requiring removal from the well.

According to the methods of the present invention, the downhole torque limiter is first set at the specified torque magnitude and then connected between a driver and a driven member, for example, two sections of drill pipe. The pipe is placed in the well and rotated with the rotational force transmitted by the downhole torque limiter until the specified torque is exceeded. When a predetermined torque magnitude is reached, the torque limiter will disengage and slip to allow relative rotation between the pipe sections and will remain disengaged until the rotation is stopped or at least the rotation rate is reduced. Once the rotation decreases, the torque limiter will reset without removing the tool from the well and, when rotation recommences, will transmit rotational force up to the specified torque magnitude.

BRIEF DESCRIPTION OF THE FIGURES

The advantages and features of the present invention can be understood and appreciated by referring to the drawings of examples attached hereto, in which.

DETAILED DESCRIPTION OF THE INVENTIONS

Figure 1:
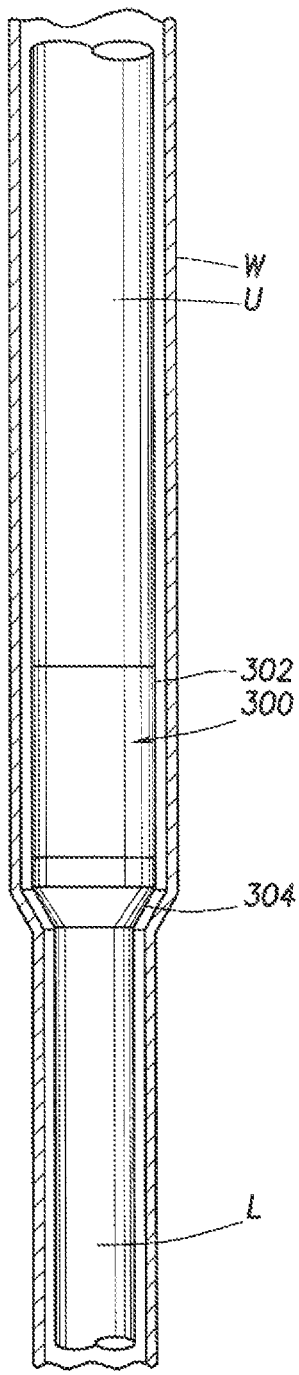
FIG. 1 is an exemplary view of a tapered drillstring, showing the downhole torque limiter of the present inventions connected to two section of drill pipe.

By reference to the drawings, wherein like or corresponding parts are designated by like or corresponding reference numbers throughout the several views, one of the presently preferred embodiments of the resettable downhole torque limiter will be described. This FIG. 1 illustrates the torque limiter 300 in its typical orientation connected in a drillstring located in the wellbore W. Drillpipe section designated "U" is the upper section and the section designated "L" is the lower section. The terms "up" and "down" are used herein to refer to the directions along the wellbore toward and away from the well head and not to gravitational directions. The term "tubing string" or "drillstring" or "drillpipe" are used herein to refer to coil tubing, tubing, drill pipe or other tool deployment strings. While the example selected for explanation is drillpipe, the torque limiter of the present invention can be used with tubing, casing, downhole tools or any type of tubular members.

Torque limiter 300 has an upper driver end 302 and a lower driven end 304. Typically, upper end 302 and lower end 304 have threaded connections for making up torque limiter 300 within a tubular string, for example, a drillstring. A central bore B (not shown in FIG. 1) extends the length of torque limiter 300, to permit fluids to be pumped through the tool and down the drillstring.

Driver end 302 is connected to upper section U by a threaded connection. In the illustrated example, the upper section U is connected to the surface rig and can be raised, lowered and rotated thereby. Driven end 304 is connected to the reduced diameter lower section L. As is typical, a smaller diameter wellbore casing can be present, necessitating the use of the reduced diameter lower section L to access the smaller diameter wellbore casing. In the illustrated embodiment, torque limiter 300 connects upper U and lower L sections together and transmits rotational movement and torque to lower section L.

As will be explained in detail, torque limiter 300 can be set up to allow the driver end 302 and driven end 304 ends to slip with respect to each other when the magnitude of the torque applied to torque limiter 308 exceeds the preset limit. Thus, when the torque applied by a drilling rig while rotating upper section U exceeds a specified limit torque limiter 300 will allow you upper and lower ends to slip. According to a particular feature of the present invention, when rotation of the upper section ceases or is reduced, torque limiter 300 will reset to condition where the ends no longer slip with respect to each other, and rotational movement and torque will transferred to lower section L.

The details of the construction and operation of torque limiter 300 will be described by reference to FIGS. 2A through 11. The major components of torque limiter 300 comprise: upper driver mandrel assembly 320; lower driven mandrel 340; inner sleeve 360; outer sleeve 380; first cup-shaped body 402 and second piston assembly 420. Upper driver mandrel 320 comprises upper mandrel 322 and upper mandrel extension 324 joined together by threads T and sealed by an annular seal S. Connection means C in the form of internal threads are located on the external end of upper mandrel 322.

Inner sleeve 360 is mounted in upper mandrel extension 324 and forms grooves 364 between upper mandrel extension 324 and inner sleeve 360. The inner sleeve 360 is actually made up of a plurality of annular sections 362 with annular seals S in the adjacent edges. Each annular section 362 has at least one axially extending port 368 extending therethrough. Lower mandrel 340 extends into upper mandrel extension 324 and inner sleeve 360 and forms an annular chamber 366. Packing P seals the annulus between the upper and lower mandrels. The upper mandrel 320 is provided with a connection means C in the form of external threads on its external end. The connection means C on the upper and lower mandrels accommodate connection of torque limiter 300 to a drillstring or the like.

Figure 2A:
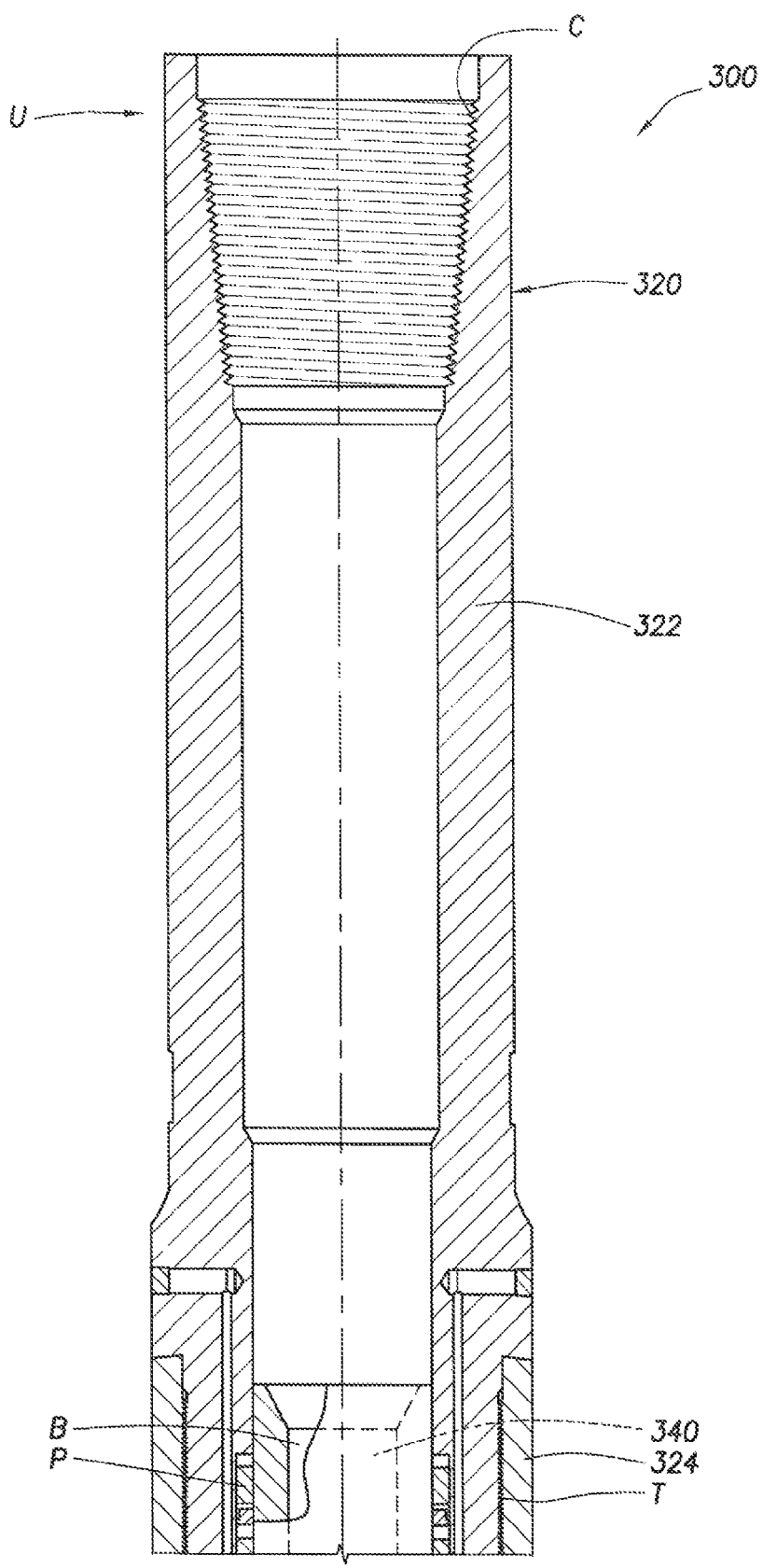
FIG. 2A-E illustrates a longitudinal cross-sectional view of the downhole torque limiter of the present inventions.
Figure 2B:
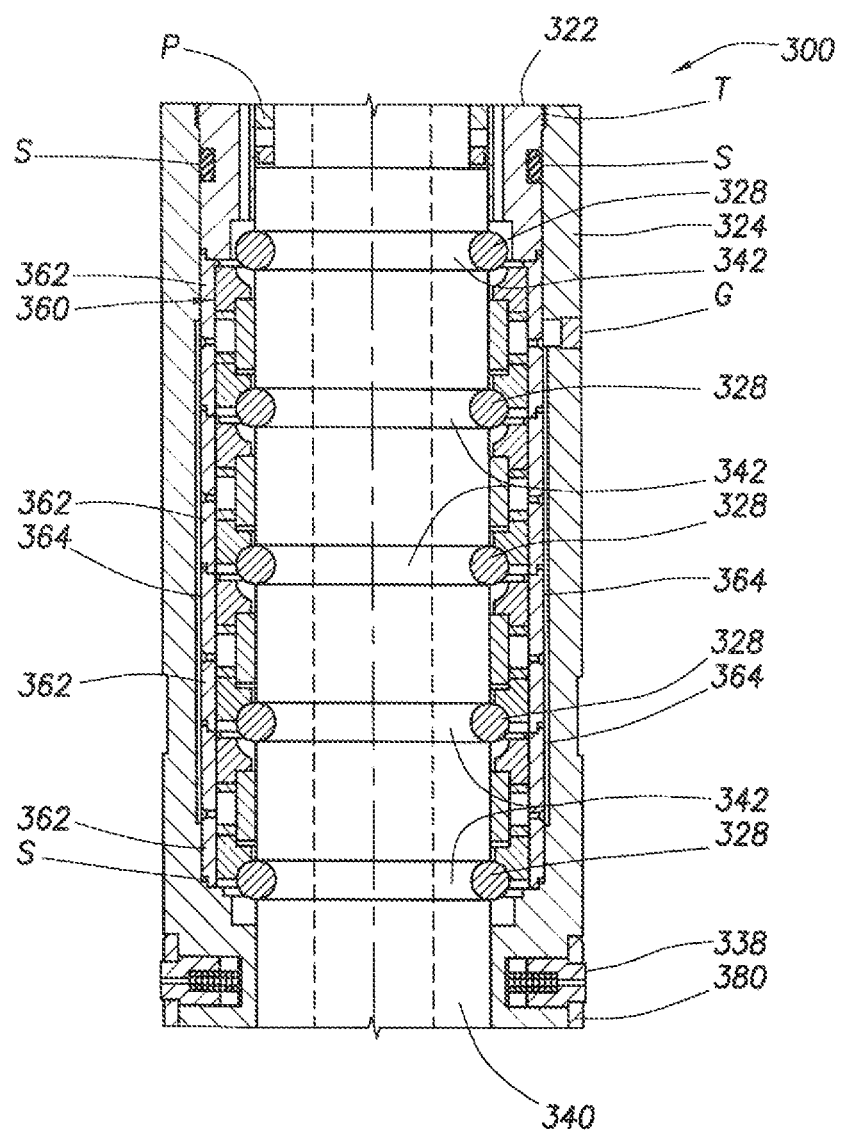

As illustrated in FIG. 2B, bearing and race assemblies 326, located in inner sleeve 360, pivotally connect lower mandrel 340 to upper mandrel assembly 320. In the present embodiment, five separate ball bearing sets 328 engage annular grooves 342 in reduced diameter portion 344 of lower mandrel 340 and act as multiple thrust bearings to transfer axial loads between upper mandrel assembly 320 and lower mandrel 340. Suitable ports G are provided for inserting lubricant into chamber 366 and bearing race assemblies 326. As illustrated in FIG. 2E, bearing race assemblies 326 are hydraulically connected such that the thrust forces are balanced between ball bearing set 328. Each of the bearing race assembly 326 is cup shaped and comprises a pair of annular oppositely facing bearing races 330 and 331 and an annular liner 332. In this view, the torque limiter is loaded in axial tension with the ball bearings, contacting the downward facing bearing races 330. It should be understood that when in compression, the lower mandrel 340 will shift down from the illustrated position to place the ball bearings in contact the upward facing races 331. Race assemblies 326 are mounted to shift axially between annular stops 370 on inner sleeve sections 362 as the load direction changes.

During assembly of the bearing system, grease is injected into and fills grooves 364. Grease also moves through ports 368 to fill in annular voids 372 around liners 332. This system acts to balance the axial loads among the thrust bearing assemblies. Balancing is achieved by the bearing races 330 acting as axial pistons. Seal rings S seal between sections 362. Sections 362 and annular liner 332 form annular chambers that act as cylinders in which the bearing races travel. Because the annular chambers are in communication with one another through the ports 368 in each outer sleeve 362 and the grooves(s) 364, the force exerted by one ball set on its outer races 330 and 331 is transmitted to the other outer races, which move to exert the force on their restraint. The races facing the same direction will be restrained by the ball bearings and transmit the load to the lower mandrel 340, effectively sharing it in this reaction. The races facing the opposite direction will be restrained by a shoulder. This is true for both load directions. Some movement of the mandrel 340 is required to change load direction, and ensure the bearing balls cannot be locked by opposing outer races engaging simultaneously due to assembly dimensional variation. The axial force is therefore shared by all bearing races in one direction. This eliminates the typical problem of precision shimming axial bearing sets to attempt load sharing, and the inherent problems in assembling bearing sets in a challengingly small space.

Figure 2C:
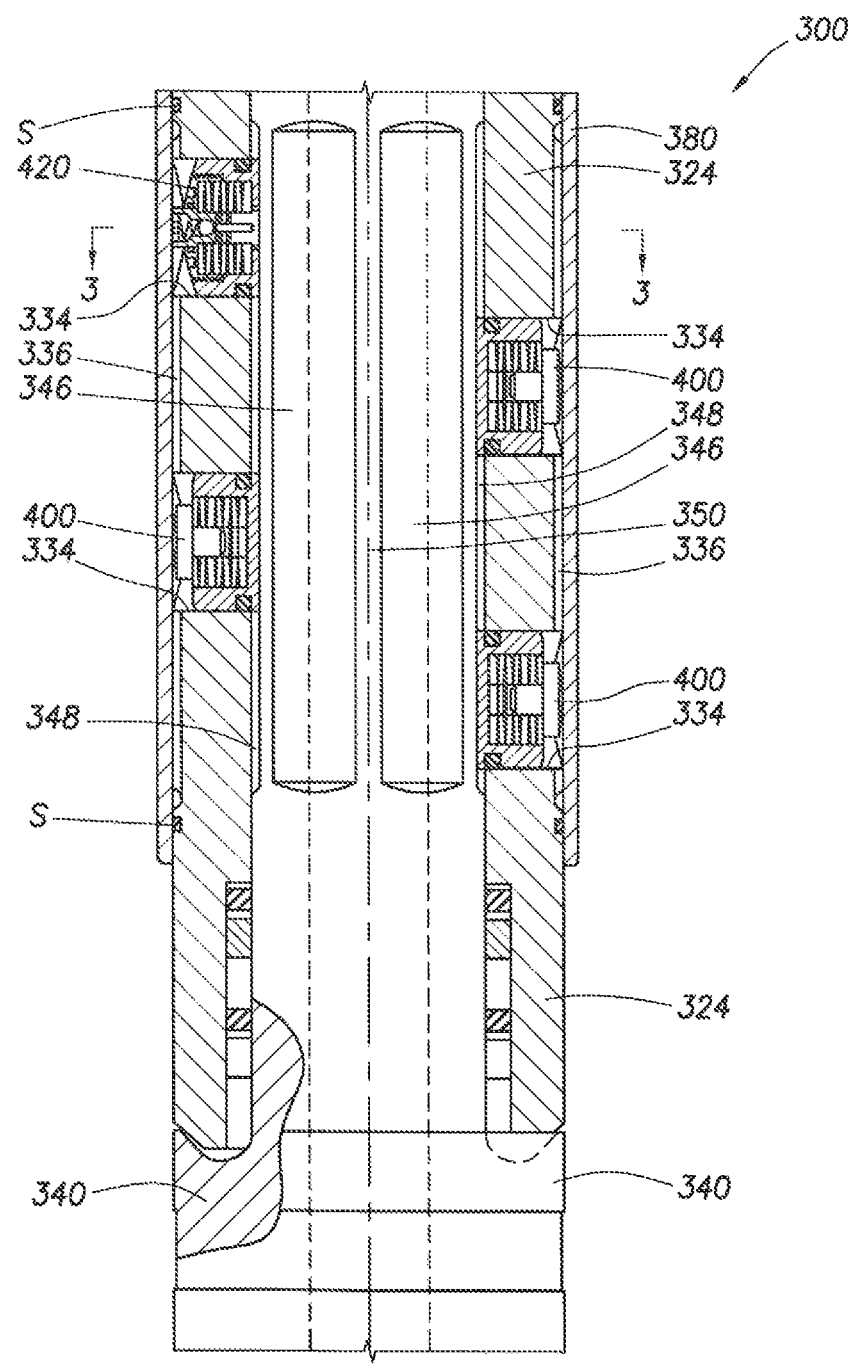
Figure 2D:
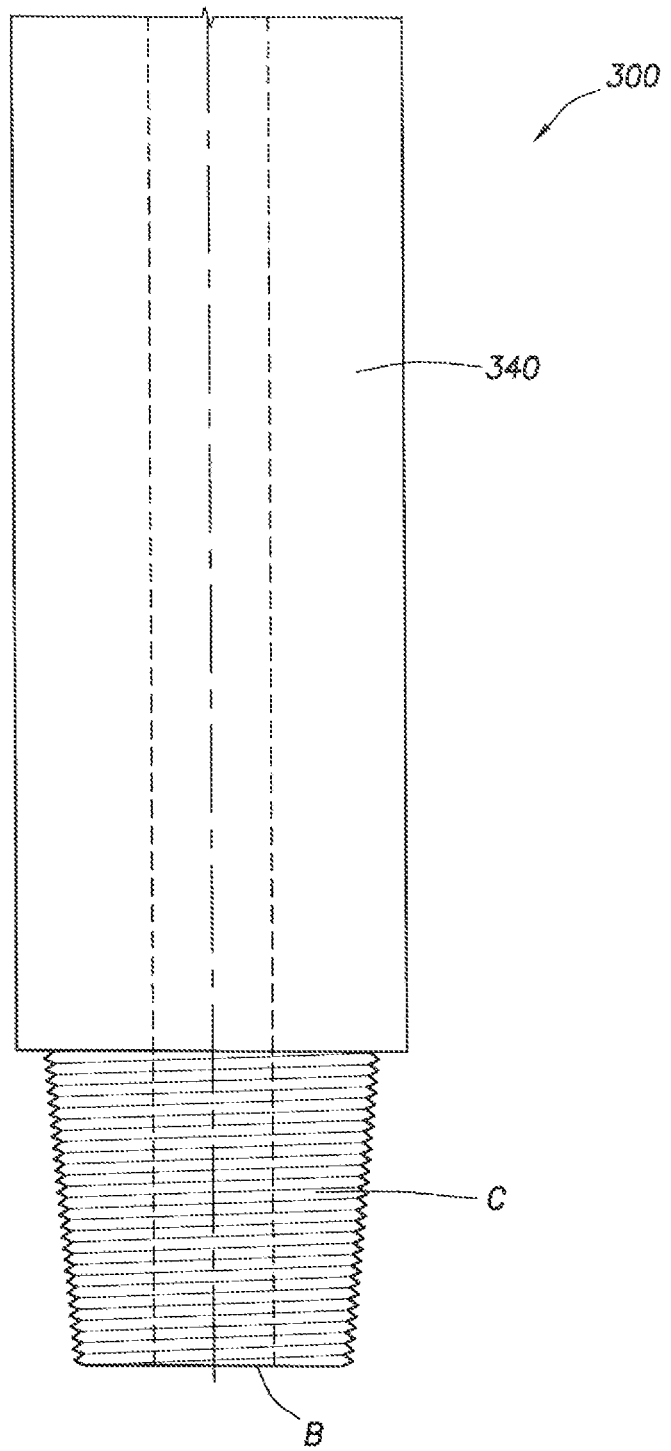
Figure 2E:
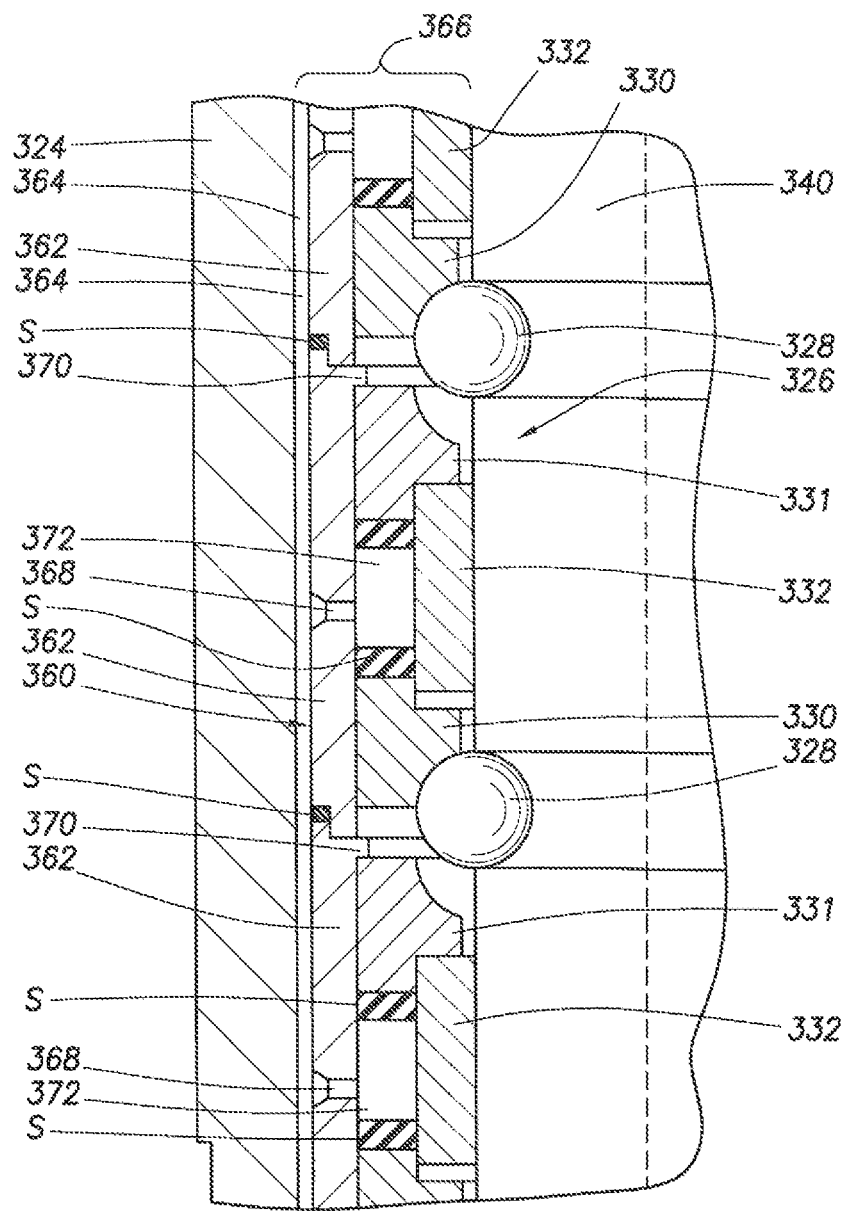
Figure 3:
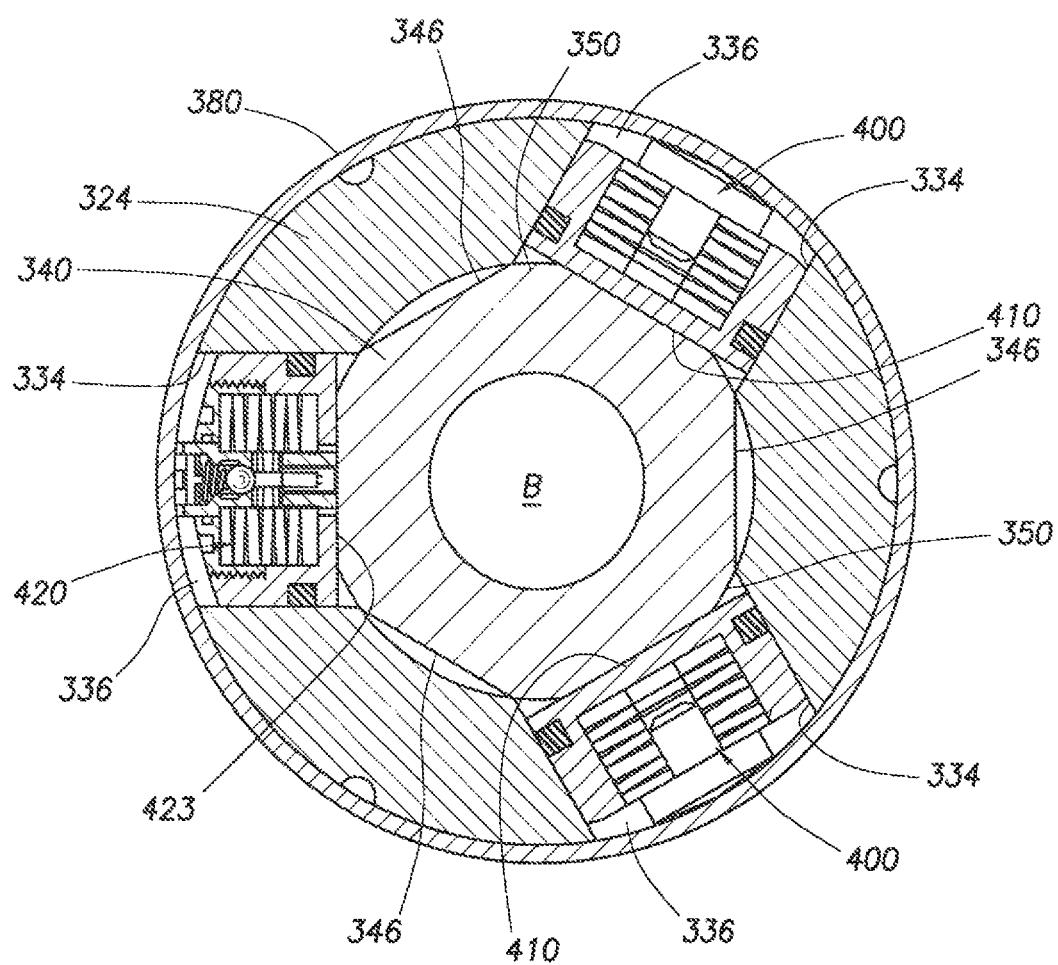
FIG. 3 is a cross sectional taken on line 3-3 of FIG. 2 looking in the direction of the arrows.

In FIGS. 2C and 3, outer sleeve 380 is illustrated mounted around upper mandrel extension 324 to form an annular chamber 336 there between. Grub screws 338 carried by upper mandrel extension 324 engage outer sleeve 380 to fix it into position. Suitable seals S close off the ends of annular chamber 336.

As illustrated in FIGS. 2C, 3, 7 and 8, upper mandrel extension 324 has a plurality of radially extending bores 334. In the illustrated embodiment, twelve separate bores 334 (four sets of three) are present. The individual bores in each set are circumferentially spaced, one hundred and twenty degrees apart with adjacent sets offset by sixty degrees.

Radially movable piston assemblies 400 and 420 are mounted to reciprocate in bores 334. In the illustrated embodiment, eleven first piston assemblies 400 and one second piston assembly 420 are mounted in the twelve bores 334. However, the number of bores and mix of piston assemblies can be varied according to the anticipated loads on the torque limiter.

Figure 5:
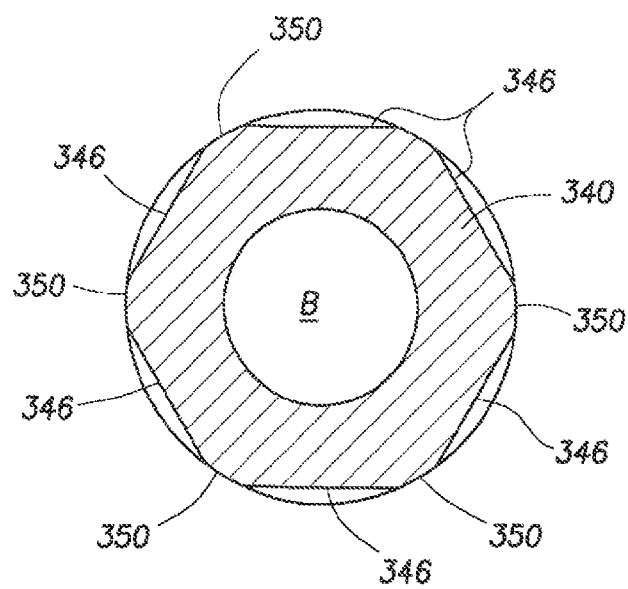
FIG. 5 is a cross-section view taken on line 5-5 of FIG. 4, looking in the direction of the arrows.
Figure 4:
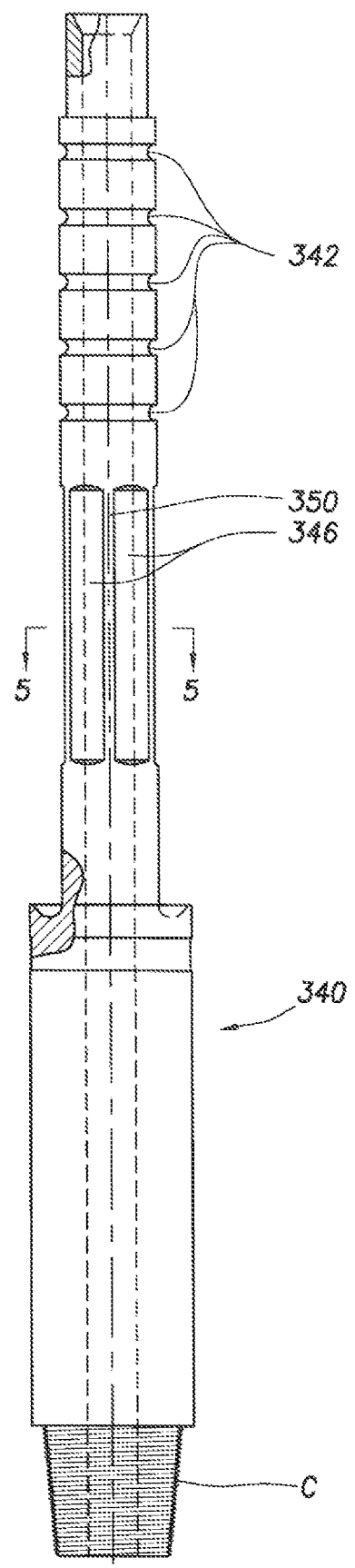
FIG. 4 is a plan view partially in section of the lower mandrel of the torque limiter of the present inventions.
Figure 6:
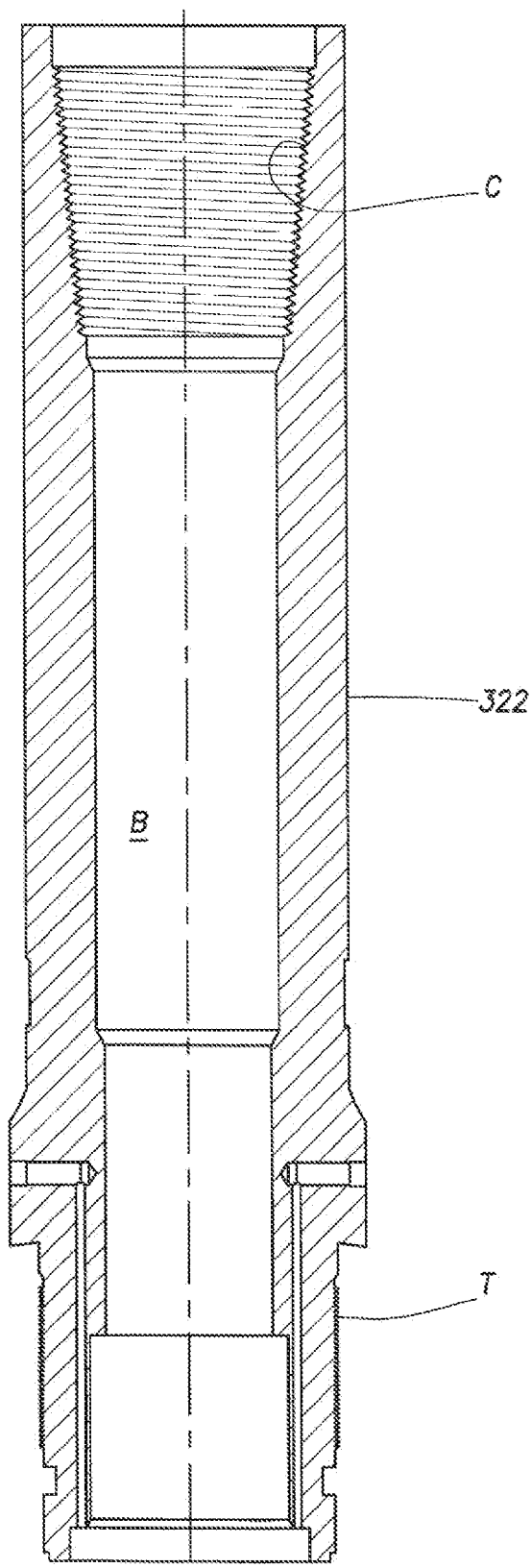
FIG. 6 is a longitudinal cross-section view of the lower mandrel of the torque limiter of the present inventions.
Figures 7, 8:
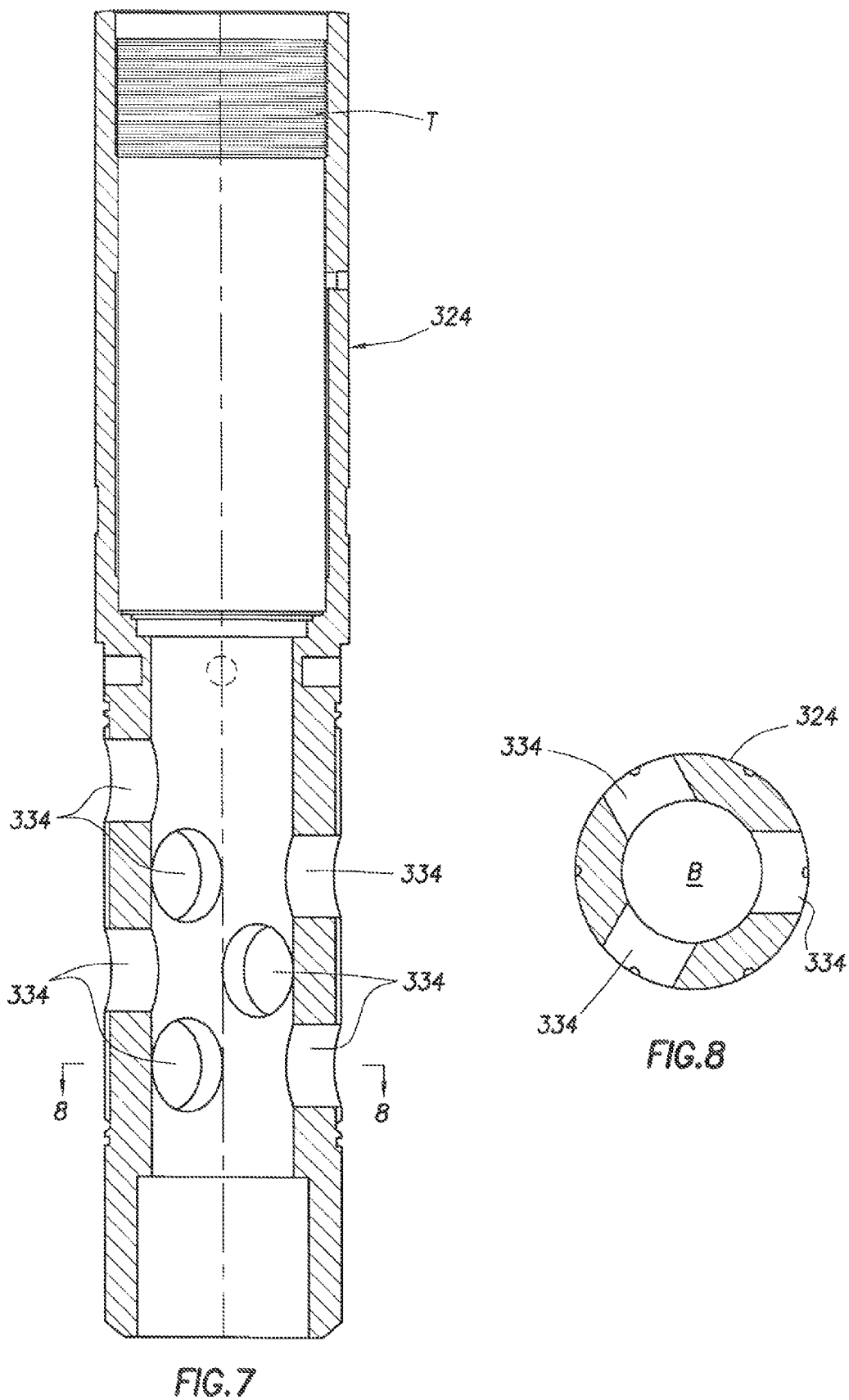
FIG. 7 is a longitudinal cross section of the center mandrel of the drill string clutch of the present inventions.
FIG. 8 is a cross-section view of the center mandrel of the drill string clutch of the present inventions.

In FIGS. 3, 4 and 5, lower mandrel 340 has contact surfaces 346 separated by ridges 350 formed thereon and positioned to be adjacent to radially extending bores 334. Contact surfaces 346 define chambers 348 inside upper mandrel extension 324. In this embodiment, six axially extending contact surfaces 346, circumferentially spaced sixty degrees apart, are present on lower mandrel 340. As will be described in detail, when the piston assembly 400 and 402 are in the engaged positions, they will contact surfaces 346 to transfer rotational movement and torsional forces between upper and lower mandrels. Piston assemblies 400 and 420 are illustrated in the Figures in the engaged position. When pistons are in the disengaged position (retracted from the contact surfaces), upper and lower mandrels are uncoupled and can rotate with respect to each other.

Figure 9:
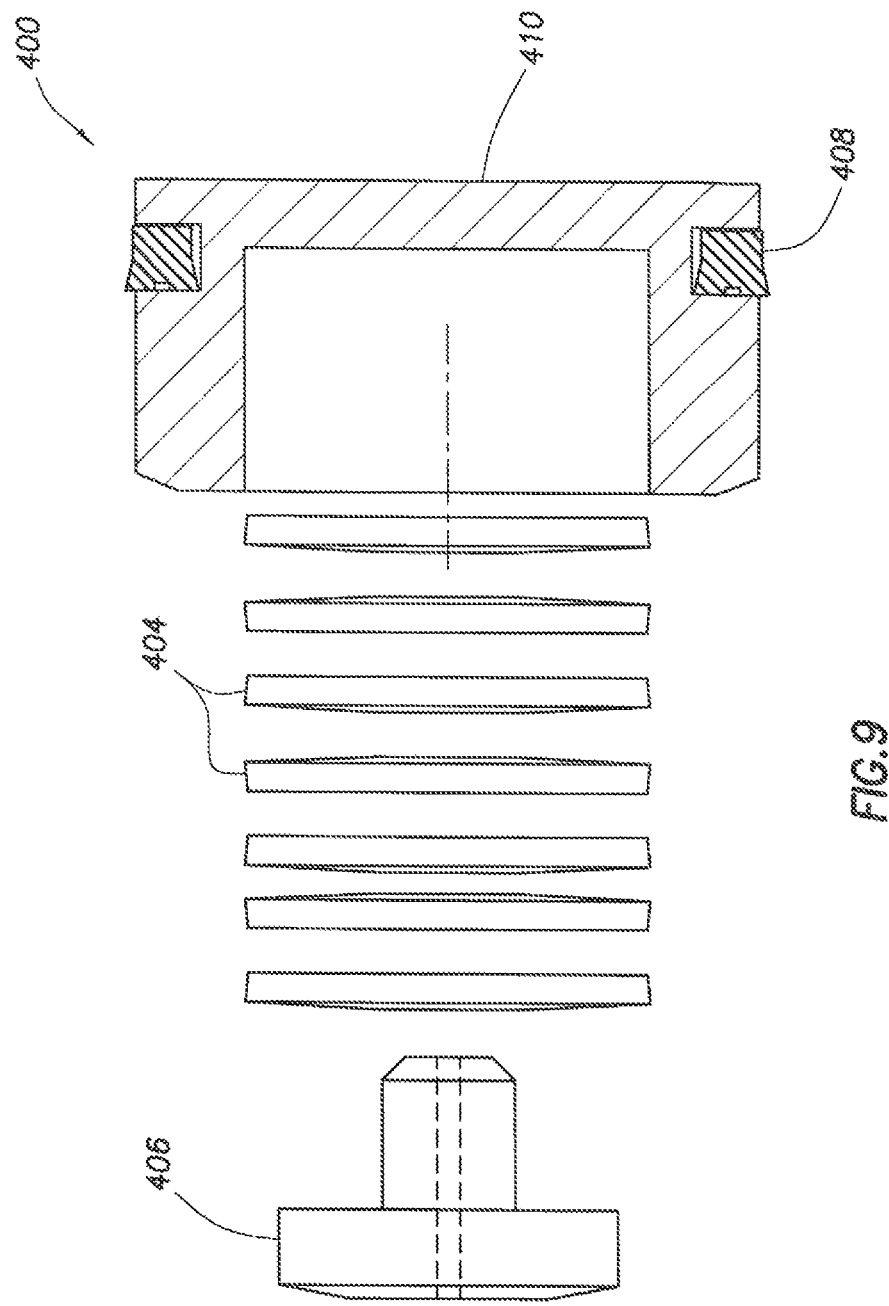
FIG. 9 is an exploded view of one embodiment of a piston assembly of the drill string clutch of the present inventions.

The structural details of piston assembly 400 are illustrated in FIG. 9. Piston assembly 400 comprises: body 402, a plurality of Belleville springs 404, mushroom-shaped spring follower 406, and annular seal 408. A contact surface 410 is formed on body 402. Annular seal 408 will seal with internal wall bores 334. When piston assemblies 400 are installed in bores 334, Belleville springs 404 will resiliently urge body 402 apart from spring follower 406.

As illustrated in FIGS. 2C and 3, the action of Belleville springs 404 will resiliently urge or force contact surface 410 on body 402 in a direction to contact one of the contact surfaces 346 on lower mandrel 340. The mushroom-shaped spring follower 406 engages the inner surface of outer sleeve 380. As will be explained in more detail hereinafter, hydraulic fluid fills annular chamber 336, bores 334 and chambers 348. Piston assemblies 400 and 420 are hydraulically locked in position by the hydraulic fluid. As the hydraulic fluid moves between chambers 336 and 348, contact surface 410 will move into and out of engagement with lower mandrel 340. As used herein the term "hydraulically locked" is used to refer to the condition where a piston or other item is held in position against movement in a cylinder or chamber by a fluid.

Figure 10:
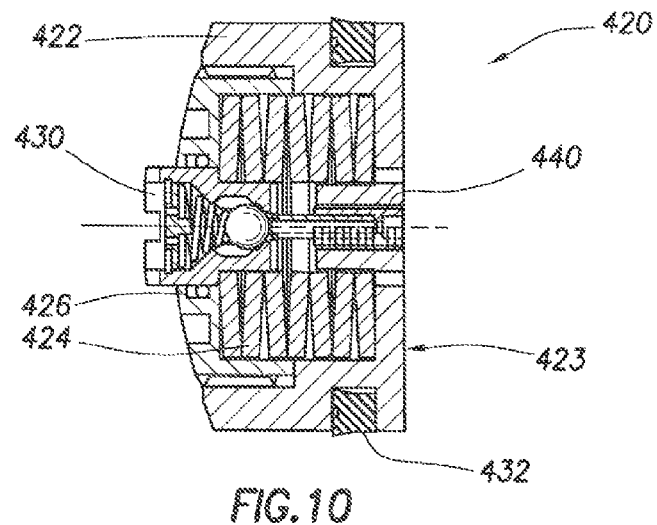
FIG. 10 is an assembly view of another embodiment of a piston assembly of the drill string clutch of the present inventions.
Figure 11:
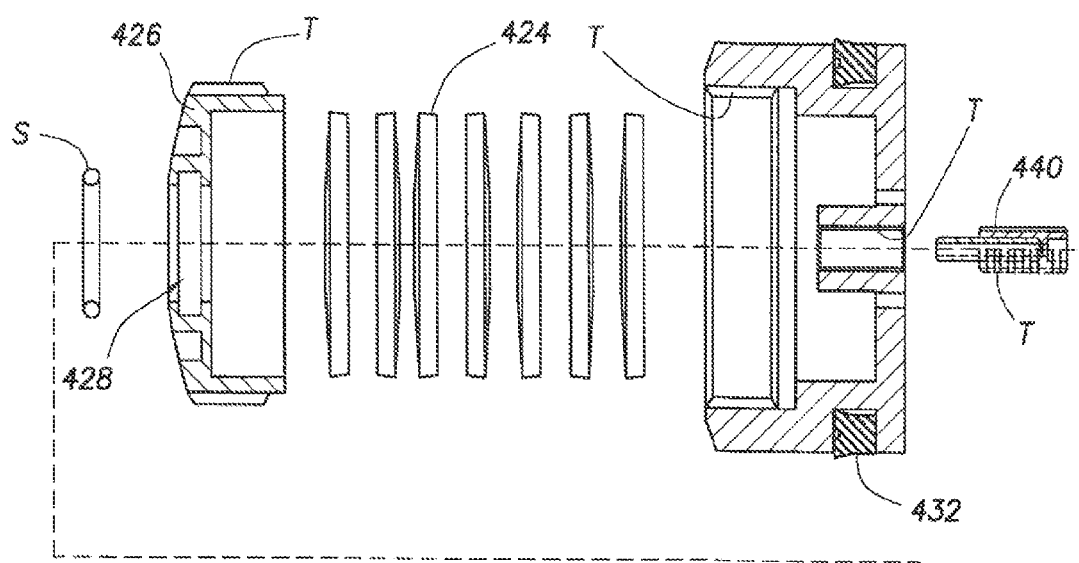
FIG. 11 is an exploded view of another embodiment of a clutch piston assembly illustrated in FIG. 10 of the drill string clutch of the present inventions.
Figure 11:
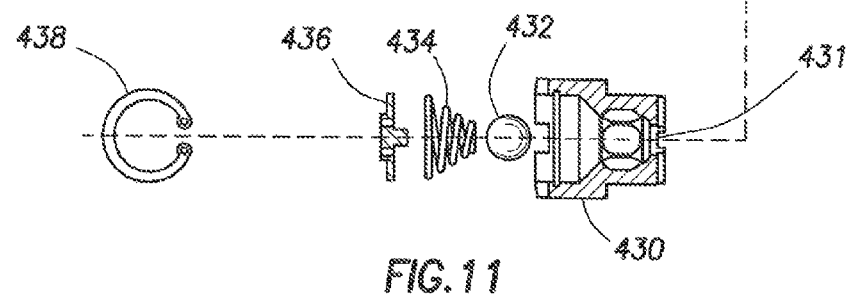

The structural details of piston assembly 420 are illustrated in FIGS. 10 and 11. Piston assembly 420 comprises a body 422, Belleville springs 424, cap 426, seat 430, ball valve 432, and spring 434. Body 422 has an annular seal 434 for sealing against the interior walls of bore 334. Cap 426 has external threads T which engage internal threads T in body 422. When cap 426 is threaded into body 422, Belleville springs 424 will be compressed. An annular seal S is mounted in bore 428 of cap 426. Hollow pin 440 is threaded into body 422 and extends into the assembly toward bore 428. The axial position of the pin can be adjusted by threading the pin into or out of the body. Ports 442 formed in contact surface 423 of body 422. Ball valve 432 is mounted in seat 430 and is held in seat 430 blocking port 431 by an assembly of spring 434, support 436 and snap ring 438. As is illustrated in FIG. 10, when assembled ball 432 blocks port 431, and is positioned adjacent to pin 440. When the pressure differential across seat 430 compresses Belleville springs 424, seat 430 moves toward pin 440 to dislodge ball 432, allowing fluid pressure to equalize across piston assembly 420.

As illustrated in FIGS. 2C and 3, the action of Belleville springs 424 will resiliently urge or force contact surface 423 on body 422 in a direction toward the engaged position, contacting one of the contact surfaces 346 on lower mandrel 340. Seat 430 will engage Belleville springs 424 and the inner surface of outer sleeve 380. When the force generated by differential hydraulic fluid pressure acting across seat 430 exceeds the force exerted by springs 424, seat 430 will tend to move toward pin 440. If enough pressure force is exerted, seat 430 will move to a point where ball 432 contacts pin 440 and is dislodged from port 431. With the ball dislodged, hydraulic lock of the piston is removed by fluid leaking or flowing from annular chamber 336 into chambers 348, allowing piston assembly 420 to move away from contact surfaces 346 to the disengaged position. It is also essential to note that the travel of the piston will act on the valve by the pin moving up against the ball. As such, slight movement of the seat (having attained the relief pressure) opens the valve and holds it open, making the easy outward movement of all pistons possible. Second, the restricted flow path through piston assembly 420 means that, for example, at speeds above approximately seven rpm the pistons do not travel back "down" far enough to allow re-seating of the ball. As the piston 420 engages the ridges 350, slight pumping will occur. There is no substantial pressure differential across the pistons other than that created by the inherent flow restriction in piston 420 and so a minimal heat buildup and torsional resistance.

It should be noted that the number and rating of the Belleville springs will be proportional to the torque magnitude at which the torque limiter will disengage and allow the upper and lower mandrels to slip (rotate with respect to each other). Accordingly, the torque limiter can be preset to slip or disengage at a torque magnitude related to the tubing string or tool attached to the lower mandrel by adjusting the number and rating of the Belleville springs and adjusting the axial position of the pin. Also note that the axial position of pin 440 in the body 422 is adjustable. By turning the pin-screw assembly and extending the travel of the seat 430 needed before the ball is unseated, a higher hydraulic pressure (and therefore torque) is required to compress the Belleville springs this greater distance. An appreciable amount of torque variation is hereby attained.

The method of using the torque limiter of the present invention comprises first assembling the torque limiter with the proper Belleville springs and pin 440 adjusted to set the specified torque magnitude required to be transmitted by the device. Moving the pistons 400 and 420 to the engaged position with the piston surfaces 410 and 423 contacting surfaces 346 on the lower mandrel 340 and the pistons hydraulically locked in the engaged position. Assembling the torque limiter in a tubing string and lowering the tubing string into a subterranean wellbore. Rotating the tubing string while the torque limiter is in the engaged position and utilizing the torque limiter to transmit torque through the device up to the specified torque magnitude. Rotating the upper or driver mandrel assembly 320 while engaging the piston assemblies 400 and 420 with the contact surfaces 346 transmits torque and rotational movement to the lower driven mandrel 340.

Next, moving the pistons 400 and 420 from the engaged position to the disengaged position when a specified torque magnitude is exceeded. The pistons are moved to the disengaged position when fluid pressure in annular chamber 336 is relieved by engaging the ball valve 432 with the pin 440 whereby the ball is moved away from the seat 430 venting fluid from annular chamber 336. Venting fluid across piston 420 will remove the hydraulic lock and allow all the pistons to move away from the lower mandrels contact surfaces 346. With the pistons in the disengaged position, the upper and lower mandrels are free to rotate with respect to each other. As the pistons rotate in the disengaged position, the contact surfaces 410 and 423 will engage ridges 350 on the lower mandrel 340 and be prevented from returning to the engaged position until relative rotation between the upper and lower mandrel ceases or is substantially reduced in rate.

To reset the torque limiter to the engaged position, the pistons must be permitted to return to a position where they engage contact surfaces 346 and are hydraulically locked in place. For example, once relative rotation this ceases, the force of the Belleville Springs will cause the contact surfaces on the pistons to move into engagement with the lower mandrel's contact surfaces 346. During this piston movement, hydraulic fluid flows from chamber 348 through piston 420 and into annular chamber 336. It should be appreciated that the process of resetting the torque limiter, by moving the pistons moving the pistons back into the engaged in disengaged position, can be repeated as many times as necessary when a specified torque magnitude is exceeded.

Materials

It is to be understood, as known to those of ordinary skill in the relevant art field, that the torque limiter would further comprise various seal and bearing elements, certain of which are shown in the accompanying drawings. Also, torque limiter 300 may be made of suitable materials well known to those of ordinary skill in the relevant art, such as high strength steel alloys, resilient parts for seals, etc.

While the preceding description contains many specificities, it is to be understood that same are presented only to describe some of the presently preferred embodiments of the invention, and not by way of limitation. Changes can be made to various aspects of the invention, without departing from the scope thereof. For example, dimensions and materials can be changed to suit particular situations; the torque limiter can be run in conjunction with other apparatus; and various methods of use of the downhole clutch may be employed.

Therefore, the scope of the invention is not to be limited to the illustrative examples set forth above, but encompasses modifications which may become apparent to those of ordinary skill in the relevant art.

What is claimed is:

1. A bearing assembly, comprising:
a first member telescoped into a tubular member to form an annulus therebetween;
at least two axially spaced sets of bearings mounted in the annulus in annular grooves in one of the first member and the tubular member; and
at least two bearing races slidably mounted on the other of the first member and the tubular member positioned to engage the at least two axially spaced sets of bearings, each bearing race having an upward-facing race and a downward-facing race;
wherein the bearings of the at least two axially spaced sets of bearings are in contact with either the upward-facing race or the downward-facing race when in a first position, and are in contact with either the downward-facing race or the upward-facing race when in a second position.

2. The bearing assembly of claim 1, wherein the at least two bearing races travel axially within the annulus.

3. The bearing assembly of claim 2, wherein the bearing races are hydraulically coupled.

4. The bearing assembly of claim 2, wherein the annulus further comprises an inner sleeve in the tubular member that includes inner sleeve sections and annular liners in which the bearing races are slidably mounted.

5. The bearing assembly of claim 4, wherein each inner sleeve section further includes a port extending therethrough.

6. The bearing assembly of claim 5, wherein the inner sleeve sections and annular liners form annular chambers in fluid communication with one another through the ports.

7. The bearing assembly of claim 1, wherein at least one of the bearing sets comprise spherical bearings.

8. The bearing assembly of claim 1, wherein the upward-facing race and the downward-facing race of each bearing race is separated by a shoulder.

9. A bearing assembly, comprising:
first and second members telescoped together to form an annulus therebetween;
at least two axially spaced bearing assemblies mounted in the annulus to connect the members to rotate with respect to each other;
each bearing assembly comprising a plurality of spherical balls, an annular groove in one of the members, the groove engaging the balls; a bearing race mounted on the other member to move axially with respect to another member, the race engaging the balls; and a hydraulic piston reciprocally mounted in a chamber radially offset from the first member and connected to the second member holding the bearing race in axial position with respect to the second member; and
the piston axially positioning the bearing races being connected in fluid communication.

10. The bearing assembly of claim 9, wherein each bearing race comprises a pair of oppositely facing bearing race elements.

11. The bearing assembly of claim 10, wherein the similarly facing race elements of each bearing race the elements move in the same axial direction.

12. The bearing assembly of claim 9, wherein the hydraulic piston is in contact with the first member when in an engaged position.

13. A method of balancing an axial load in a tubing string at a subterranean location in a well, comprising:
transferring an axial load from one bearing race to at least one other bearing race of a bearing assembly in the tubing string; and
shifting bearings from a first position in contact with one of an upward-facing race and a downward-facie race to a second position in contact with the other of the upward-facing race and the downward-facing race.

14. The method of claim 13, wherein the axial load is transferred through a hydraulic coupling of the bearing races.

15. The method of claim 14, wherein the axial load is shared by the bearing races in one direction.

16. The method of claim 14, wherein the upward-facing race and the downward-facing race comprise a pair of annular oppositely facing bearing race elements, each race element having a surface shaped to mate with at least one set of bearings.

17. The method of claim 16, wherein each race element facing the same axial direction is restrained by the bearings and transmits the axial load to the first member.

18. The method of claim 16, wherein each race element facing the opposite axial direction is restrained by an annular stop on the tubular member.

19. The method of claim 16, wherein the bearing race elements are at least partially concave.

20. The method of claim 16, wherein the bearings are spherical.

* * * * *